United States Patent
Zhou et al.

(10) Patent No.: US 10,225,484 B2
(45) Date of Patent: Mar. 5, 2019

(54) METHOD AND DEVICE FOR PHOTOGRAPHING DYNAMIC PICTURE

(71) Applicants: Min Zhou, Shanghai (CN); Xiliang Guo, Beijing (CN)

(72) Inventors: Min Zhou, Shanghai (CN); Xiliang Guo, Beijing (CN)

( * ) Notice: Subject to any disclaimer, the term of this patent is extended or adjusted under 35 U.S.C. 154(b) by 14 days.

(21) Appl. No.: 15/461,683

(22) Filed: Mar. 17, 2017

(65) Prior Publication Data
US 2018/0160021 A1    Jun. 7, 2018

(30) Foreign Application Priority Data
Dec. 6, 2016  (CN) .......................... 2016 1 1109583

(51) Int. Cl.
H04N 5/232 (2006.01)
H04N 5/235 (2006.01)
H04N 5/265 (2006.01)

(52) U.S. Cl.
CPC ....... H04N 5/2353 (2013.01); H04N 5/23293 (2013.01); H04N 5/265 (2013.01)

(58) Field of Classification Search
CPC ... H04N 5/2353; H04N 5/265; H04N 5/23293
See application file for complete search history.

(56) References Cited

U.S. PATENT DOCUMENTS 8,599,283 B2    12/2013  Matsunaga et al.
8,872,937 B2    10/2014  Matsunaga et al.
9,313,403 B2    4/2016   Hamada
2007/0146538 A1* 6/2007  Kakinuma ............. H04N 5/144
                                                       348/362

(Continued)

FOREIGN PATENT DOCUMENTS

JP    2015-141487 A    8/2015

OTHER PUBLICATIONS

JP Office Action dated Feb. 7, 2018 for JP Application No. 2017-057125 (5 pages).

(Continued)

*Primary Examiner* — Gevell V Selby
(74) *Attorney, Agent, or Firm* — Eversheds Sutherland (US) LLP

(57) ABSTRACT

A method and a device for photographing a dynamic picture. The method includes: entering a dynamic picture photographing mode; continuously photographing a plurality of images at different shutter speeds, wherein the images includes dynamic images photographed at a first shutter speed and dynamic images photographed at a second shutter speed, the first shutter speed is greater than second shutter speed; automatically composing the static image and dynamic image to obtain a dynamic picture. According to the solution provided by the embodiment of the present invention, photographing the static images and the dynamic images respectively at different shutter speeds and automatically composing the static image and dynamic image to obtain the dynamic picture, a user can automatically obtain a relatively ideal dynamic picture through a terminal, no requirement is attached to photographing skill and picture processing technique of the user, entertainment and experience of the terminal user are increased.

8 Claims, 1 Drawing Sheet

(56) References Cited

U.S. PATENT DOCUMENTS

| | | | |
|---|---|---|---|
| 2011/0149095 A1* | 6/2011 | Kikuchi | H04N 5/23248 348/208.4 |
| 2012/0008005 A1* | 1/2012 | Fukunishi | H04N 5/145 348/222.1 |
| 2015/0097978 A1* | 4/2015 | Lee | H04N 5/2355 348/208.6 |
| 2017/0019608 A1 | 1/2017 | Ono | |

OTHER PUBLICATIONS

JP Office Action for JP Application No. 2017-57125 dated Aug. 14, 2017 (4 pages).

* cited by examiner

METHOD AND DEVICE FOR PHOTOGRAPHING DYNAMIC PICTURE

CROSS REFERENCE TO RELATED APPLICATION

This application claims the priority benefit of Chinese Application No. 201611109583.7 filed Dec. 6, 2016. The contents of which are hereby incorporated by reference in its entirety.

TECHNICAL FIELD

The present invention relates to a terminal application technology, in particular to a method and a device for photographing a dynamic picture.

BACKGROUND

In order to photograph a dynamic picture, a photographer usually adopts a slow-shutter focus tracking method. However, it is not easy for a photographer to operate a camera; long-term training is needed and the dynamic effect of photographed dynamic pictures is not ideal. As a result, it is very difficult for a photographer to photograph dynamic pictures. Aiming at the above-mentioned situation, how to easily obtain relatively ideal dynamic pictures is a problem which needs to be solved.

SUMMARY

In order to solve the above-mentioned technical problem, the present invention provides a method and a device for photographing a dynamic picture, such that a relatively ideal dynamic picture can be automatically obtained through a terminal, no requirement is attached to the photographing skill and picture processing technique of a user, and the entertainment and the experience of the terminal user are increased.

In order to achieve the purpose of the present invention, the present invention provides a method for photographing a dynamic picture, including: entering a dynamic picture photographing mode; continuously photographing a plurality of images at different shutter speeds, wherein the images include static images photographed at a first shutter speed and dynamic images photographed at a second shutter speed, the first shutter speed is greater than the second shutter speed; and automatically composing the static image and the dynamic image to obtain a dynamic picture.

Alternatively, the method further includes: photographing the plurality of images by using a single lens; and storing the plurality of images continuously photographed in a RAW format.

Alternatively, continuously photographing a plurality of images at different shutter speeds includes: respectively photographing one or more groups of images in a continuous photographing mode at different shutter speeds; and each group of images in the one or more groups of images includes one or more static images and one or more dynamic images.

Alternatively, the method further includes: selecting a static image with a photographing effect which satisfies a preset standard from each group of photographed images, selecting a dynamic image from a first group of images in which the selected static image is located, and composing the selected static image and the selected dynamic image; wherein the dynamic image is a dynamic image, which has a smallest photographing time difference from the static image, in the first group of images.

Alternatively, the method further includes: setting an object which needs to be clearly displayed in the dynamic picture; and automatically composing a static image and a dynamic image to obtain a dynamic picture includes: composing the object which needs to be clearly displayed in the static image and other contents except the object which needs to be clearly displayed in the dynamic image to obtain the dynamic picture.

Alternatively, the method further includes: presetting a dynamic picture photographing gear; and after the dynamic picture photographing gear is enabled, automatically photographing the dynamic picture.

In order to achieve the above-mentioned purpose, the embodiment of the present invention further provides a device for photographing a dynamic picture. The device includes: a mode module, a photographing module and a composing module.

The mode module is configured to enter a dynamic picture photographing mode.

The photographing module is configured to continuously photograph a plurality of images at different shutter speeds, wherein the images include static images photographed at a first shutter speed and dynamic images photographed at a second shutter speed, and the first shutter speed is greater than the second shutter speed.

The composing module is configured to automatically compose a static image and a dynamic image to obtain a dynamic picture.

Alternatively, the photographing module is further configured to: photograph the plurality of images by using a single lens; and store the plurality of images continuously photographed in a RAW format.

Alternatively, the photographing module is configured to continuously photograph a plurality of images at different shutter speeds in following way: respectively photographing one or more groups of images in a continuous photographing mode at different shutter speeds; and wherein each group of images in the one or more groups of images includes one or more static images and one or more dynamic images.

Alternatively, the composing module is further configured to: select a static image with a photographing effect which satisfies a preset standard from each group of photographed images, select a dynamic image from a first group of images in which the selected static image is located, and compose the selected static image and the selected dynamic image, wherein the dynamic image is a dynamic image, which has a smallest photographing time difference from the static image, in the first group of images.

Alternatively, the device further includes a setting module configured to setting an object which needs to be clearly displayed in the dynamic picture.

The composing module is configured to automatically compose a static image and a dynamic image to obtain a dynamic picture in following way: composing the object which needs to be clearly displayed in the static image and other contents except the object which needs to be clearly displayed in the dynamic image to obtain the dynamic picture.

Alternatively, the device further includes: a dynamic picture photographing gear.

The dynamic picture photographing gear is configured to, after being enabled, automatically photograph the dynamic picture.

Compared with the prior art, the embodiment of the present invention includes: entering a dynamic picture photographing mode; continuously photographing a plurality of images at different shutter speeds, wherein the images include dynamic images photographed at a first shutter speed and dynamic images photographed at a second shutter speed, the first shutter speed is greater than the second shutter speed; and automatically composing the static image and the dynamic image to obtain a dynamic picture. According to the solution provided by the embodiment of the present invention, by respectively photographing the static images and the dynamic images at different shutter speeds and automatically composing the static image and the dynamic image to obtain the dynamic picture, a user can automatically obtain a relatively ideal dynamic picture through a terminal, no requirement is attached to the photographing skill and picture processing technique of the user, and the entertainment and the experience of the terminal user are increased.

Other features and advantages of the present invention will be described in the description below, and partially become obvious according to the description or can be understood by implementing the present invention. The purpose and other advantages of the present invention may be realized and obtained through structures specially pointed out in the description, claims and drawings.

BRIEF DESCRIPTION OF DRAWINGS

The drawings are used for providing further understanding about the technical solution of the present invention, which constitute a part of the description and are used together with the embodiments of the present application for explaining the technical solution of the present invention instead of limiting the technical solution of the present invention.

SPECIFIC EMBODIMENTS

Figure 1:
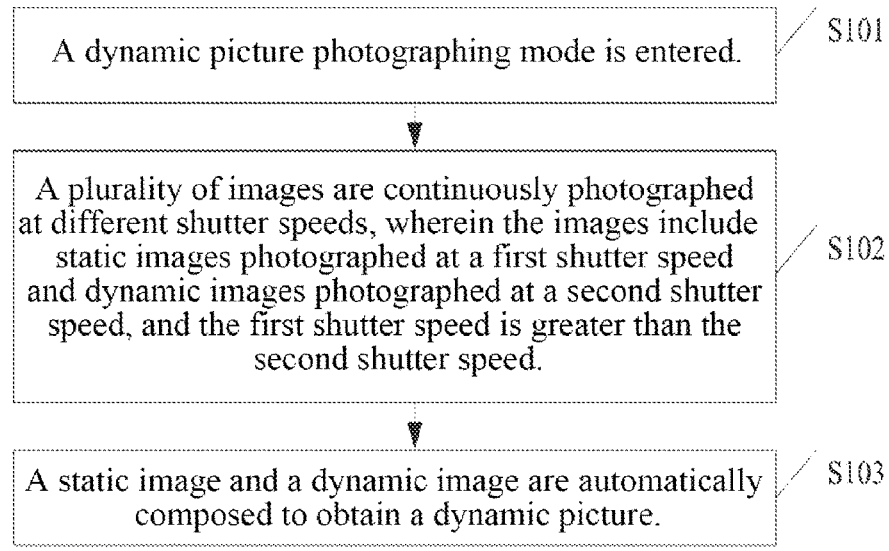
FIG. 1 illustrates a flowchart of a method for photographing a dynamic picture according to the embodiment of the present invention.
Figure 2:
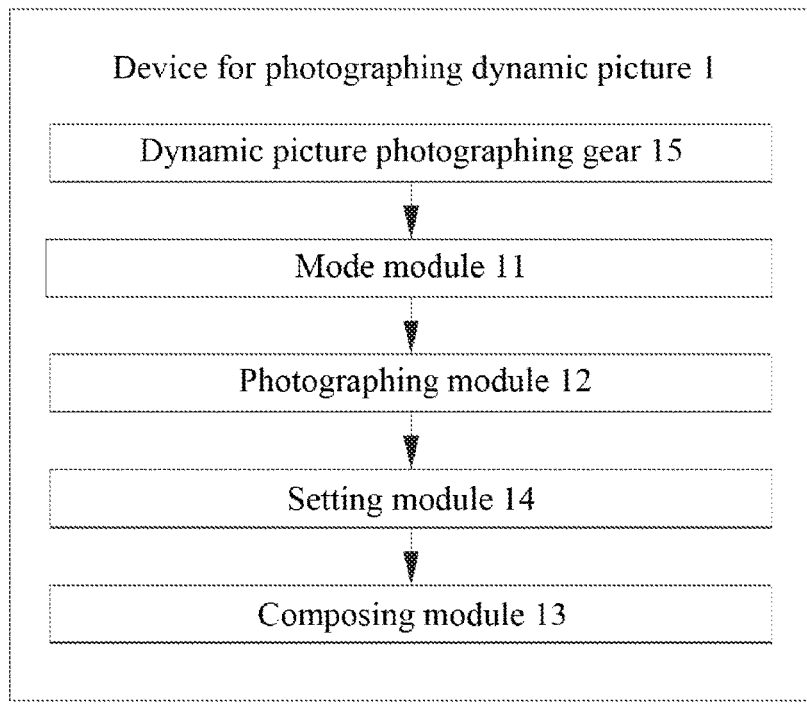
FIG. 2 illustrates a diagram of components of a device for photographing a dynamic picture according to the embodiment of the present invention.

In order to enable the purpose, technical solution and advantages of the present invention to be more clearly understood, the embodiments of the present invention will be described below in detail with reference to the drawings. It needs to be stated that the embodiments in the present application and the features in the embodiments may be freely combined under the situation of no conflict.

Steps illustrated in the flowchart of the drawing may be executed in a computer system of a group of computer-executable instructions, for example. In addition, although a logic sequence is illustrated in the flowchart, under certain situations, the illustrated or described steps may be executed according to a sequence different from the sequence here.

A dynamic picture is a picture obtained by adding visually dynamic elements in a static image. Therefore, in order to obtain a dynamic picture, a lens may be used for respectively photographing a static image and a dynamic image in short time, a static image at a moment of solidification is photographed under a high-speed shutter and then the shutter is immediately switched to a low-speed shutter to photograph a dynamic image with a moving trajectory, or contrarily, a dynamic image with a moving trajectory is photographed under a low-speed shutter and then the shutter is immediately switched to a high-speed shutter to photograph a static image at a moment of solidification; and at a later stage, the two images are composed to obtain a perfect dynamic picture combined with dynamic and static senses. However, at present, in order to photograph a dynamic picture, a photographer usually adopts a slow-shutter focus tracking method. It is not an easy thing for a photographer to operate a camera, long-term training is needed and the dynamic effect of photographed dynamic pictures is not ideal. As a result, it is very difficult for a photographer to photograph dynamic pictures. Aiming at the above-mentioned situation, how to easily obtain relatively ideal dynamic pictures is a problem which needs to be solved by us.

At present, with the rapid development of various terminals such as mobile phones, tablet computers and portable notebook computers, terminals with photographing functions have already widely existed in the market. The terminals with the photographing functions basically have all photographing functions of common cameras, e.g., functions of photographing color pictures and black-and-white pictures. In addition, with the functional extension and technical improvement of current terminals, a picture processing technique has already been a main function of smart terminals at current. Therefore, based on the above-mentioned contents, if a function of photographing a dynamic picture is added onto terminals, the difficulty of how to photograph a dynamic picture in a long term will be solved.

In order to achieve the purpose of the present invention, the present invention provides a method for photographing a dynamic picture. As illustrated in FIG. 1, the method includes steps S101-S103.

In step S101, a dynamic picture photographing mode is entered.

In the embodiment of the present invention, in order to distinguish from common picture photographing, a dynamic picture photographing mode may be preset in a terminal. In that mode, the terminal will automatically photograph a dynamic picture.

It needs to be stated that, the dynamic picture photographing mode may be triggered in any feasible mode, e.g., through an operation of pressing a key on the terminal, an operation of sliding a touch screen of the terminal, or through speech control. In the embodiment of the present invention, the specific triggering mode of the dynamic picture photographing mode is not limited.

Alternatively, the method further includes: a dynamic picture photographing gear is preset; and after the dynamic picture photographing gear is enabled, the dynamic picture is automatically photographed.

In the embodiment of the present invention, the dynamic picture photographing mode may also be entered by triggering the preset dynamic picture photographing gear and the dynamic picture is automatically photographed.

It needs to be stated that the dynamic picture photographing gear may be a real key or switch and may also be a virtual switch in the form of software. The specific form of the dynamic picture photographing gear is not limited herein. In addition, the dynamic picture photographing gear may be a novel gear that coexists with an AV gear, a TV gear, an M gear and a P gear preset in a photographing terminal in parallel. For example, it may be defined as a D gear. That gear may be set to a shutter priority mode.

In addition, it needs to be stated that the shutter priority mode may also be selected in the dynamic picture photographing mode.

In step S102, a plurality of images are continuously photographed at different shutter speeds, wherein the images include static images photographed at a first shutter speed and dynamic images photographed at a second shutter speed, and the first shutter speed is greater than the second shutter speed.

In the embodiment of the present invention, after the dynamic picture photographing mode of the embodiment of the present invention is entered according to the above-mentioned solution, an object to be photographed at current can be photographed. Alternatively, the plurality of images are photographed by using a single lens. In the embodiment of the present invention, the operation of continuously photographing the plurality of images at different shutter speeds is completed by photographing by using a single lens. The single lens may be a lens on a single-lens terminal and may also be any lens in a dual-lens terminal. The specific implementation mode thereof is not limited herein.

In the embodiment of the present invention, in order to photograph pictures with two different effects by using a single lens, i.e., the above static image and the above dynamic picture, the lens for photographing needs to photograph the object to be photographed at current at different shutter speeds, wherein the static image may be photographed at a first shutter speed, the dynamic picture may be photographed at a second shutter speed and the first shutter speed is greater than the second shutter speed.

Alternatively, the first shutter speed refers to a shutter speed with shutter exposure time being t1, where $t1 < 1/100$ s; and the second shutter speed refers to a shutter speed with shutter exposure time being t2, where $t2 \geq 1/100$ s.

In the embodiment of the present invention, as known according to the current camera photographing technique, the shutter speed which is used by a camera lens photographing method is generally between $1/40$ s to $1/100$ s. If a slower speed is used for photographing, the entire picture will be obscure; and if a speed higher than $1/100$ s is used for photographing, the extent of dynamic sense will be influenced such that the picture seems having no dynamic sense. In the embodiment of the present invention, in order to obtain a relatively ideal photographing effect, according to the experience, the first shutter speed and the second shutter speed may be set to take $1/100$ s as a critical point. It needs to be stated that, in different application scenarios, e.g., when dynamic pictures with different effects need to be photographed, the first shutter speed and the second shutter speed may be set to different numerical values, and the specific numerical values of the first shutter speed and the second shutter speed are not limited herein.

In the embodiment of the present invention, according to the above-mentioned contents, it can be seen that, in order to photograph a dynamic image, a higher shutter speed needs to be adopted to solidify a moment of an image, and in order to photograph a dynamic image, a lower shutter speed needs to be adopted to obtain a moving trajectory of an object to be photographed. It can be understood as that the static image is a photographed image of a moment and the dynamic image is a photographed image of a process. The static image refers to a still image of a state of the object to be photographed at a moment of exposure, and the static image is a still and changeless image. The dynamic image refers to a process image of the object to be photographed with state changing during exposure and the dynamic image is an image having a moving and changing effect. For example, when a maiden who is turning is photographed, the static image is a state image when the maiden turns to a certain moment, and if a skirt hemline of the maiden flies at this moment, the static image is an image which presents that the skirt hemline flies to a certain position; the dynamic image is a process image of a turning process of the maiden in a photographing process, and if the skirt hemline of the maiden flies at this moment, the dynamic image is an image which presents a flying process of the skirt hemline in a time period of exposure; and since exposure time is relatively long, a presentation effect of the flying process in the image is streaking.

In the embodiment of the present invention, since the photographed static image and dynamic image need to be composed in subsequent image processing to obtain a dynamic picture, in the process of photographing the static image and the dynamic image by using the single lens, time difference of switching between the first shutter speed for photographing the static image and the second shutter speed for photographing the dynamic image needs to be as short as possible. Herein we select a continuous photographing mode, i.e., after a dynamic picture photographing program is entered, the terminal will photograph one or more groups of images in the continuous photographing mode. Herein the images are grouped according to two types of concepts, one is that each group of images include at least one static image and at least one dynamic image; and the other is that each group of images include one or more static images or includes one or more dynamic images. The two grouping modes will be respectively described below.

Mode 1: Each Group of Images Include at Least One Static Image and at Least One Dynamic Image.

Alternatively, an operation of continuously photographing a plurality of images at different shutter speeds includes: respectively photographing one or more groups of images in a continuous photographing mode at different shutter speeds; and each group of images in the one or more groups of images include one or more static images and one or more dynamic images.

In the embodiment of the present invention, the number of groups of images, e.g., one group, two groups, three groups or four groups which need to be photographed may be preset during continuous photographing. Specifically, the number may be set according to the need of the user, or photographing can be performed directly according to the default number of groups of images to be photographed, e.g., three groups.

In the embodiment of the present invention, if the photographing situations of each preset group of images are different during photographing, e.g., a first group of images include five static images and two dynamic images, a second group of images include four static images and one dynamic images, etc., a sequence of photographing groups of images may also be preset, or photographing can be performed according to a default sequence or according to any sequence.

In the embodiment of the present invention, a sequence of photographing static images and dynamic images in each group may also be preset during photographing. For example, static images are firstly photographed and then dynamic images are photographed, or dynamic images are firstly photographed and then static images are photographed, or static images are firstly photographed, then dynamic images are photographed and then static images are photographed, or dynamic images are firstly photographed, then static images are photographed and then dynamic images are photographed. Or, in order to minimize speed switching between the first shutter speed and the second shutter speed, when an image which is finally photographed in a previous group is confirmed to be a dynamic image, a dynamic image is firstly photographed during photographing of a next group of images; and if an image which is finally photographed in a group is a static image, a static image is firstly photographed during photographing of a next group of images, i.e., the types of adjacent photographed images between every two groups of images are kept to be the same.

It needs to be stated that, in the above-mentioned photographing process, a mechanical shutter may be used and an electronic shutter may also be used when photographing at the first shutter speed or photographing at the second shutter speed, an electronic shutter may be used when photographing at the first shutter speed (i.e., high-speed shutter), and a mechanical shutter may be used when photographing at the second shutter speed (i.e., low-speed shutter). The specific type of shutter is not limited herein.

In the embodiment of the present invention, during actual photographing, the specific numbers of photographed dynamic and static images in each group are not limited herein, either. For example, during photographing of the first group of images, after five static images are continuously photographed, two dynamic images are immediately photographed; and during photographing of the second group of images, after one static image is photographed, one dynamic image is immediately photographed. Or, during photographing of each group of images, one static image is photographed and then one dynamic image is photographed. It needs to be stated that, since the purpose of adopting the continuous photographing mode and photographing a plurality of static images is mainly to determine a clearest image therefrom, more static images may be photographed in each group during photographing of static images. However, during photographing of dynamic images, since the effect of each dynamic image in a similar time period is similar, it is not greatly significant to photograph more dynamic images. Therefore, fewer dynamic images may be photographed during photographing of dynamic images.

In addition, it needs to be stated that, in the above-mentioned photographing process, the first shutter speeds for photographing various groups of images may be the same and may also be different, e.g., the static images in the first group are photographed at a shutter speed of 1/400 s and the static images in the second group are photographed at a shutter speed of 1/200 s. Similarly, the second shutter speeds may be the same and may also be different, e.g., the dynamic images in the first group are photographed at a shutter speed of 1/40 s and the dynamic images in the second group are photographed at a shutter speed of 1/20 s. The specific speed is not limited herein.

Mode 2: Each Group of Images Includes One or More Static Images or Includes One or More Dynamic Images.

Alternatively, the operation of continuously photographing a plurality of images at different shutter speeds further includes: respectively photographing one or more groups of static images and one or more groups of dynamic images in a continuous photographing mode at different shutter speeds, wherein each group of static images includes one or more static images; and each group of dynamic images includes one or more dynamic images.

In the embodiment of the present invention, in the continuous photographing mode, the number of groups of images, e.g., two groups, three groups or four groups which need to be photographed may also be preset. Specifically, the number may be set according to the need of the user, or photographing can be performed directly according to the default number of groups of images to be photographed, e.g., four groups. It needs to be stated that, in this grouping mode, at least two groups of images are included, i.e., a group of static images and a group of dynamic images.

In the embodiment of the present invention, a sequence of photographing each group of images may also be preset. Alternatively, one or more groups of static images are continuously photographed and then one or more groups of dynamic images are continuously photographed, or one or more groups of dynamic images are continuously photographed and then one or more groups of static images are continuously photographed, or a group of static images and a group of dynamic images are alternately photographed, wherein the specific number of photographed images in each group is not limited herein.

It also needs to be stated that, in the above-mentioned photographing process, first shutter speeds for photographing each group of static images may be the same and may also be different, similarly, second shutter speeds for photographing each group of dynamic images may be the same and may also be different, and the specific speed is not limited herein.

Alternatively, the method further includes: an exposure value is kept unchanged when the plurality of images are photographed at different shutter speeds.

In the embodiment of the present invention, Exposure Value (EV) is defined as that an exposure value is a logarithmic scale system using 2 as a base:

$$EV = \log_2 \frac{f^2}{t}$$

where f is an aperture value; and t is exposure time (in inverse proportion to shutter speed), with a unit being second.

Therefore, the exposure value may be calculated through the above-mentioned calculation formula, and a current exposure value may be obtained on the basis that an aperture value f and a shutter speed 1/t are obtained.

In other embodiments of the present invention, the exposure value may also be calculated through a preset exposure value mapping table. The preset exposure value mapping table may include all implementable shutter speeds, aperture values and ISOs of the photographing terminal, different shutter levels are set for different shutter speeds, and different shutter levels correspond to different shutter steps. Similarly, in the preset exposure value mapping table, different aperture levels are also set for different aperture values, and different aperture levels correspond to different aperture steps; and different light sensing levels are set for different ISOs, and different light sensing levels correspond to different light sensing steps. One embodiment of the preset exposure value mapping table is as shown in Table 1. It needs to be stated that the following table only lists partial contents, corresponding shutter steps, aperture steps and light sensing steps will correspondingly increase or decrease by 1 with the gradual increase or decrease of the shutter speed, aperture value and ISO, and one-by-one enumeration is not provided herein.

TABLE 1

| Shutter speed | 1 | ½ | ¼ | ⅛ | 1/15 | 1/30 | 1/60 | 1/125 | 1/250 | 1/500 | 1/1000 |
|---|---|---|---|---|---|---|---|---|---|---|---|
| Shutter step T | 0 | 1 | 2 | 3 | 4 | 5 | 6 | 7 | 8 | 9 | 10 |
| Aperture value | 1 | 1.4 | 2 | 2.8 | 4 | 5.6 | 8 | 11 | 16 | 22 | 32 |
| Aperture step F | 0 | 1 | 2 | 3 | 4 | 5 | 6 | 7 | 8 | 9 | 10 |
| ISO | | 100 | 200 | | 400 | | 800 | | 1600 | 3200 | 6400 |
| Light sensing step I | | 0 | 1 | | 2 | | 3 | | 4 | 5 | 6 |

In the embodiment of the present invention, the exposure value in the photographing process of the terminal can be kept unchanged through the above-mentioned method embodiment.

It needs to be stated that, in order to guarantee that the exposure value of the terminal is unchanged, in a process of adjusting the shutter speed, aperture value and ISO value, if the requirement is not satisfied when the adjustment limit of the terminal is reached, especially when an extremely low shutter speed is needed in order to achieve a certain dynamic trajectory effect during photographing of dynamic images but the aperture value or ISO value has already been adjusted to a limit value at this moment, the following solution may be adopted to adjust a light amount under this situation.

Alternatively, the method further includes: before dynamic images are photographed, an inlet light amount of a lens is reduced to a preset inlet light amount threshold by adjusting a preset electronic dimmer.

In the embodiment of the present invention, the inlet light amount of the lens is a main factor which influences the photographing of dynamic images. Therefore, in order to ensure that the terminal photographs an ideal dynamic picture at any time, an electronic dimmer needs to be preset in the terminal to facilitate the control of the inlet light amount of the lens at any time. Under normal situations, the shutter speed is a main control factor for the photographing of dynamic images. However, due to the influence of a photographing environment, if the shutter speed has already been adjusted to be low enough but satisfactory dynamic images cannot be obtained, at that moment we need to adjust the inlet light amount of the lens by adjusting the preset electronic dimmer to achieve the purpose. It needs to be stated that there are various modes for adjusting the electronic dimmer, and the terminal may automatically adjust the electronic dimmer through the preset inlet light amount threshold; a comprehensive operation may also be performed through a preset algorithm in combination with the shutter speed and sensitivity ISO to obtain an optimum inlet light amount to control the electronic dimmer; and in addition, the adjustment of the inlet light amount of the lens may also be realized by detecting the control performed by the user on the preset adjustment gear of the dimmer. In the embodiment of the present invention, the specific adjustment mode of the electronic dimmer is not limited. In addition, the preset inlet light amount threshold may also be self-defined according to different application scenarios to obtain dynamic images with different effects.

Alternatively, the method further includes: a plurality of continuously photographed images are stored in a RAW format.

In the embodiment of the present invention, the original meaning of RAW is "unprocessed". It can be understood that RAW images are original data of captured light source signals which are converted into digital signals by a Complementary Metal Oxide Semiconductor (CMOS) or Charge-Coupled Device (CCD) image sensor. A RAW file is a file which records original information of a digital camera sensor and simultaneously records some metadata (such as ISO setting, shutter speed, aperture value and white balance) which are generated during photographing by a camera. The RAW format is an unprocessed and uncompressed format, and RAW may be conceptualized as "original image coding data" or may be more vividly called as "digital negative film".

It needs to be stated that the dynamic picture finally obtained in the solution of the embodiment of the present invention may also be stored in the RAW format and may also be stored in a Joint Photographic Expert Group (JPEG) format, a Graphics Interchange Format (GIF) format and a Bitmap (BMP) format, and the specific storage mode thereof is not limited herein.

In the embodiment of the present invention, after a plurality of groups of image are photographed in a continuous photographing mode according to the foresaid solution, these images are all stored at a preset location of the terminal in the RAW format, e.g., a preset cache space, and the information of the images in the RAW format may be directly extracted by the terminal during subsequent processing to facilitate the picture composing operation of the terminal.

In step S103, the static image and the dynamic image are automatically composed to obtain a dynamic picture.

In the embodiment of the present invention, after the plurality of groups of images are photographed in the continuous photographing mode according to the foresaid solution, the information of the images in the RAW format of the groups of images may be obtained to perform automatic composing to obtain a dynamic picture.

In the embodiment of the present invention, before composing is performed to obtain the dynamic picture, firstly at least a static image and a dynamic image need to be selected from the groups of photographed images to perform composing. Specifically, the images may be selected according to the following embodiment and that embodiment is implemented based on the foresaid grouping mode 1.

Alternatively, the method further includes: a static image with a photographing effect which satisfies a preset standard is selected from each group of photographed images, a dynamic image is selected from a first group of images in which the selected static image is located, and the selected static image and the selected dynamic image are composed, wherein the dynamic image is a dynamic image, which has the smallest photographing time difference from the static image, in the first group of images.

In the embodiment of the present invention, the purpose of photographing a static image is to obtain the part of the image which needs to be clearly displayed in the dynamic picture, and that part of the image is an important component in the dynamic picture and is the position by which people are the most easily attracted when a picture is viewed, or is the most eye-striking position. For example, for character face images during character photographing, when people view a picture, the people are very easily and firstly attracted by the face. In addition, the photographing angle of that part of the image is a critical significance to the visual effect of the picture. For example, under sunset light of dusk, a picture of a half face of a maiden which is photographed from the side of the maiden is aesthetic, and a picture, in which the head of the maiden is only visible but the face cannot be seen, which is photographed from the back of the maiden, may give a sense of vicissitudes to people.

In the embodiment of the present invention, since different photographers have different requirements on photographing effects, people have different requirements on placement angles of an object in a static image (herein character photographing or animal photographing is mainly involved, and since a human or an animal can move, a body and a head are placed at different angles during movement. For scenery photographing or for still humans and animals, since photographing is performed at the same location and the scenery does not move, the placement angle of an object to be photographed is unchanged, the photographing angles of photographers are all the same and there is no difference in the photographing angles). Therefore, people may pre-define a relatively satisfactory angle before photographing, the angle refers to the placement angle of the head, body and the like of the object to be photographed, that is, the photographing effect required by the photographer, i.e., the preset standard, and a static image which is compliant or matched with the placement angle of the preset standard is selected from each group of photographed images as a composed image. The preset standard may be differently defined according to different photographing needs. Herein description is made by taking a face as an example.

Alternatively, the preset standard may include that a face of a human or an animal which needs to be photographed faces right to a viewer; or the face of the character or the animal which needs to be photographed is clockwise rotated for a first angle in a horizontal direction by taking an angle facing right to the viewer as zero degree; or the face of the character or the animal which needs to be photographed is anticlockwise rotated for a second angle in the horizontal direction by taking the angle facing right to the viewer as zero degree; or the face of the character or the animal which needs to be photographed is upwards rotated for a third angle in a vertical direction by taking the angle facing right to the viewer as zero degree; or the face of the character or the animal which needs to be photographed is downwards rotated for a fourth angle in the vertical direction by taking the angle facing right to the viewer as zero degree. The specific definition of the preset standard is not limited herein. In addition, in order to realize the definition of the preset standard by the photographer, a corresponding self-defining window may be preset, and the photographing effect which needs to be obtained by the photographer or the wanted placement angle of the head or body of the character or animal is defined through the self-defining window. In addition, the above-mentioned matching or compliance refers to a preset similarity threshold smaller than or equal to the preset standard, and the similarity threshold may also be self-defined according to different photographing needs or accuracy requirements and is not specifically limited herein.

In the embodiment of the present invention, in order to determine that the photographing effect of the head of the character or animal in which image is compliant with the preset standard, the face angle in each image may be recognized through a preset human face recognition technique or a face recognition technique, the recognized face area is searched for one or more characteristic points, a deflection angle of the current face relative to the standard angle (e.g., the face faces right to the viewer) is determined according to the position(s) of the one or more characteristic points, thereby the placement angle of the current face is determined, the placement angle is compared with the preset standard to determine whether the photographing angle of the current face is compliant with the preset standard, and the static image corresponding to the face image which is compliant with the preset standard is used as an image to be composed.

In addition, for static images of a scenery, since a plurality of static images which are photographed at a very short high-speed in the photographing process may be considered as essentially the same, any one static image can be selected from a plurality of groups of images as an image to be composed.

In the embodiment of the present invention, after the static image with the photographing effect which satisfies the preset standard is selected from each group of images according to the above-mentioned solution, the photographing time of each dynamic image in that group can be obtained according to the recorded image information of that group of images, and a dynamic image, which is photographed at photographing time closest to that of the selected static image, i.e., has the smallest photographing time difference, may be selected therefrom as an image to be composed. The smaller the photographing time difference from the static image is, the more synchronous the two images are, therefore the two images are more collaboratively composed when the dynamic picture is composed. Therefore, the dynamic image which has the smallest photographing time difference from the static image needs to be selected in the solution of that embodiment.

It needs to be stated that a static image and a dynamic image are respectively selected from each group for composing in the above-mentioned solution, finally a plurality of dynamic pictures are obtained and the terminal may finally determine an optimum dynamic picture according to the selection of the user. The solution can allow the user to select a satisfactory picture from numerous composed dynamic pictures, and thereby the user experience is improved. In other embodiments, a static image and a dynamic image may be directly obtained from a plurality of groups of images obtained in the continuous photographing mode for composing according to the above-mentioned solution, and finally only one dynamic picture is obtained. The solution can be used for directly determining a dynamic picture for the user and avoid the manual operation of the user.

Based on the foresaid grouping mode 2, the static image and the dynamic image may be selected according to the following embodiment.

Alternatively, the method further includes: a static image with a photographing angle which satisfies a preset standard is selected from one or more groups of static images, a dynamic image is selected from one or more groups of dynamic images, and the selected static image and the selected dynamic image are composed, wherein the dynamic image is a dynamic image, which has the smallest photographing time difference from the static image, in the first group of images.

In the embodiment of the present invention, the selection standard of the static image and the dynamic image is the same as the selection standard in the above-mentioned embodiment, and the difference lies in that, since the static images and the dynamic images are separately grouped in the embodiment, a static image with a photographing effect which satisfies the preset standard needs to be respectively selected from one or more groups of static images, and a dynamic image which has the smallest photographing time difference from the static image is selected from one or more groups of dynamic images, respectively. The specific implementation mode is the same as that of the above-mentioned embodiment and thus is not repetitively described herein.

Alternatively, the method further includes: static images and dynamic images which are photographed at adjacent photographing times are selected from a plurality of groups of images for composing; or static images and dynamic images which have the smallest photographing time difference are selected from a plurality of groups of images for composing.

In the embodiment of the present invention, the embodiment may be applicable to the above-mentioned two grouping modes. In the embodiment, a plurality of combinations of static images and dynamic images to be composed may be selected or any one combination is selected therefrom for composing; or similar to the above-mentioned solution, according to the rule that the photographing effect of the static image satisfies the preset standard, one combination is selected for composing; or one combination which is photographed in the middle of the photographing time is selected for composing and other combinations are the backup, such that the user can select other combinations for composing when the user feels unsatisfactory with the composed dynamic picture.

In the embodiment of the present invention, after the static images and the dynamic images which need to be composed are selected according to the above-mentioned solution, dynamic pictures may be automatically composed through the terminal. The operation may be implemented specifically through the following solution.

Alternatively, that the static image and the dynamic image are automatically composed to obtain the dynamic picture, includes: the object which needs to be clearly displayed in the static image and other contents except the object which needs to be clearly displayed in the dynamic image are composed to obtain the dynamic picture.

In the embodiment of the present invention, since the dynamic picture is obtained by adding dynamic elements in the static image, there is a part which needs to be clearly displayed in a dynamic picture and there is also a part which needs to be obscurely displayed in order to express a dynamic effect. The part which needs to be clearly displayed comes from the photographed static image, the part which needs to be obscurely displayed comes from the photographed dynamic image, and an image with a combination of dynamic and static senses can be called as a dynamic picture. For example, for the maiden who is turning, if the head image of the maiden is processed as the part which needs to be clearly displayed and the skirt hemline part of the maiden is processed as the part which needs to be obscurely displayed, the turning condition of the maiden is expressed through the skirt hemline which is obscurely displayed, the face information of the maiden can be obtained through the face image of the maiden, and the situation that the maiden is turning can be clearly reflected through the picture. Contrarily, if the entire image is all the part which is clearly displayed, the image is a common picture, i.e., the static image, and there is not any creativeness; and if the entire image is all the part which is obscurely displayed, the image is just an obscure picture in which the face cannot be distinguished, and the image is useless. Therefore, the image combined with dynamic and static senses can reflect the dynamic effect of the object which is photographed.

Based on the above-mentioned reasons, in the embodiment of the present invention, before the object which needs to be clearly displayed in the static image and other contents except the object which needs to be clearly displayed in the dynamic image are composed, the object which needs to be clearly displayed needs to be firstly determined.

Alternatively, the method further includes: an object which needs to be clearly displayed in the dynamic picture is set.

In the embodiment of the present invention, the object which needs to be clearly displayed may be automatically set and may also be set according to the selection of the user.

When automatic setting is performed, for example, a human head or an animal head is automatically set as the object which needs to be clearly displayed, the part of image is recognized from the obtained static image through a human face recognition technique, and the recognized image is cut out or copied and then is composed onto a corresponding position of the dynamic image to obtain the dynamic picture. For another example, a dynamic object such as flowing water, a waterfall or a flying flag is automatically set as the object which does not need to be clearly displayed, and the image area containing the dynamic picture or the image area of the object which does not need to be clearly displayed is cut out or copied and then is composed onto a corresponding position of the static image to obtain the dynamic picture. It needs to be stated that, after the dynamic picture is automatically composed through the above-mentioned mode, since the composing effect is not known, a prompt window prompting whether re-photographing or re-composing is needed may be displayed at the same time when the final dynamic picture is provided to the user, such that the user makes a feedback about the composing effect. If the user selects re-photographing, and a new static image and a new dynamic image are re-photographed, the new static image and the new dynamic image are automatically composed. If the user selects re-composing, the static image and the dynamic image are re-selected according to a different rule, or an object which needs to be clearly displayed or an object which does not need to be displayed is re-selected, and then a dynamic picture is re-composed. Here, the object which is re-selected may be different from the object which is selected at a previous time, to achieve a composing effect which is different from that obtained at the previous time, i.e., the composing process has a self-contained optimizing effect. For example, if a relatively large flowing water area is selected as an object which does not need to be displayed at a first time, in order to achieve an optimizing effect, a relatively small flowing water area may be selected at a next time.

When setting is performed according to the selection of the user, in a user editing mode, an image area which is sketched by the user on the static image or dynamic image may be detected, the area is determined as an object which needs to be clearly displayed or as an object which does not need to be displayed according to a selection instruction of the user, and finally the static image and the dynamic image are composed according to a selection result of the user to obtain a dynamic picture. For example, the user selects an area on the static image as an object which needs to be clearly displayed, and the terminal cuts out or copies the area and composes the area onto a corresponding position of the dynamic image to obtain a dynamic picture.

In the embodiment of the present invention, in order to realize the perfect transition of the edge of the composed part in the composed dynamic picture, a feathering mode may be adopted to compose the two images.

Alternatively, the method further includes: after one or more groups of images are photographed in a continuous photographing mode, a static image and a dynamic image which are to be composed are determined according to a selection result of the user in a preset manual composing window, an object which needs to be clearly displayed in the static image is determined according to a selection result of the user, and composing of a dynamic picture is performed according to a determination result.

In the embodiment of the present invention, after one or more groups of images are photographed in a continuous photographing mode, images which need to be composed are selected manually, such that the composed dynamic picture can better satisfy user requirements and the user satisfaction is improved.

Alternatively, the method further includes: after one or more groups of images are photographed in the continuous photographing mode, the one or more groups of images are sent to a preset Personal Computer (PC) and the composing of the dynamic picture is performed through the PC.

In the embodiment of the present invention, since the picture processing ability of the current PC is far greater than the picture processing ability of terminals such as smart phones, cameras, IPAD, palm computers and wearable devices, after one or more groups of images are photographed by the terminal, the composing of the dynamic picture may not be performed on the terminal but the pictures photographed by the terminal are transmitted to the PC for the composing of the dynamic picture, so as to improve the composing quality and increase the user satisfaction and experience.

So far, all basic features of the embodiment of the present invention have already been introduced. Through the solution of the embodiment of the present invention, relatively ideal dynamic pictures can be easily obtained and the entertainment and experience of the terminal user are increased. The photographing operation of the terminal is simple to perform, long-term training is not needed, no requirement is attached to the photographing skill and picture processing technique of the user, the photographing method is almost the same as the photographing method of the common mobile phone and the stability of picture output is greatly improved.

In order to realize the above-mentioned purpose, the embodiment of the present invention further provides a device 1 for photographing a dynamic picture. The device includes: a mode module 11, a photographing module 12 and a composing module 13.

The mode module 11 is configured to enter a dynamic picture photographing mode.

The photographing module 12 is configured to continuously photograph a plurality of images at different shutter speeds, wherein the images includes static images photographed at a first shutter speed and dynamic images photographed at a second shutter speed, and the first shutter speed is greater than the second shutter speed.

The composing module 13 is configured to automatically compose the static image and the dynamic image to obtain a dynamic picture.

Alternatively, the photographing module 12 is further configured to: photograph the plurality of images by using a single lens; and store the plurality of images continuously photographed in a RAW format.

Alternatively, that the photographing module 12 continuously photographs the plurality of images at different shutter speeds includes: respectively photographing one or more groups of images in a continuous photographing mode at different shutter speeds; herein each group of images in the one or more groups of images include one or more static images and one or more dynamic images.

Alternatively, the composing module 13 is further configured to: select a static image with a photographing effect which satisfies a preset standard from each group of photographed images, select a dynamic image from a first group of images in which the selected static image is located, and compose the selected static image and the selected dynamic image, wherein the dynamic image is a dynamic image, which has the smallest photographing time difference from the static image, in the first group of images.

Alternatively, the device further includes a setting module 14 configured to set an object which needs to be clearly displayed in the dynamic picture; and the composing module 13 is configured to automatically compose the static image and the dynamic image to obtain the dynamic picture in following way: composing the object which needs to be clearly displayed in the static image and other contents except the object which needs to be clearly displayed in the dynamic image to obtain the dynamic picture.

Alternatively, the device further includes: a dynamic picture photographing gear 15.

The dynamic picture photographing gear 15 is configured to, after being enabled, automatically photograph the dynamic picture.

As compared with the prior art, the embodiment of the present invention includes: entering a dynamic picture photographing mode; continuously photographing a plurality of images at different shutter speeds, wherein the images include dynamic images photographed at a first shutter speed and dynamic images photographed at a second shutter speed, the first shutter speed is greater than the second shutter speed; and automatically composing the static image and the dynamic image to obtain a dynamic picture. According to the solution provided by the embodiment of the present invention, by respectively photographing the static images and the dynamic images at different shutter speeds and automatically composing the static image and the dynamic image to obtain the dynamic picture, a user can automatically obtain a relatively ideal dynamic picture through a terminal, no requirement is attached to the photographing skill and picture processing technique of the user, and the entertainment and the experience of the terminal user are increased.

Although the implementation modes disclosed by the present invention are described above, the described contents are implementation modes which are just adopted for facilitating the understanding about the present invention instead of limiting the present invention. One skilled in the art may make any modifications and variations to the implementation modes and details without departing from the rule and scope disclosed by the present invention. However, the patent protection scope of the present invention should be still subjected to the scope defined by the attached claims.

We claim:

1. A method for photographing a dynamic picture, comprising:
   entering a dynamic picture photographing mode;
   continuously photographing a plurality of images at different shutter speeds, wherein the images comprise static images photographed at a first shutter speed and dynamic images photographed at a second shutter speed, the first shutter speed is greater than the second shutter speed; and automatically composing the static image and the dynamic image to obtain a dynamic picture;

wherein the method further comprises: setting an object which needs to be clearly displayed in the dynamic picture;

automatically composing the static image and the dynamic image to obtain a dynamic picture comprises:

composing the object which needs to be clearly displayed in the static image and other contents except the object which needs to be clearly displayed in the dynamic image to obtain the dynamic picture.

2. The method for photographing the dynamic picture according to claim 1, wherein the method further comprises: photographing the plurality of images by using a single lens; and storing the plurality of images continuously photographed in a RAW format.

3. The method for photographing the dynamic picture according to claim 1, wherein, continuously photographing a plurality of images at different shutter speeds comprises: respectively photographing one or more groups of images in a continuous photographing mode at different shutter speeds; and wherein each group of images in the one or more groups of images comprise one or more static images and one or more dynamic images.

4. The method for photographing the dynamic picture according to claim 3, wherein the method further comprises:

selecting a static image with a photographing effect which satisfies a preset standard from each group of photographed images, selecting a dynamic image from a first group of images in which the selected static image is located, and composing the selected static image and the selected dynamic image, wherein the dynamic image is a dynamic image, which has a smallest photographing time difference from the static image, in the first group of images.

5. A device for photographing a dynamic picture, comprising: a mode module, a photographing module and a composing module;

wherein the mode module is configured to enter a dynamic picture photographing mode;

the photographing module is configured to continuously photograph a plurality of images at different shutter speeds, wherein the images comprises dynamic images photographed at a first shutter speed and static images photographed at a second shutter speed, the first shutter speed is greater than the second shutter speed; and the composing module is configured to automatically compose the static image and the dynamic image to obtain a dynamic picture;

wherein the device further comprises a setting module configured to set an object which needs to be clearly displayed in the dynamic picture; and the composing module is configured to automatically compose the static image and the dynamic image to obtain a dynamic picture by:

composing the object which needs to be clearly displayed in the static image and other contents except the object which needs to be clearly displayed in the dynamic image to obtain the dynamic picture.

6. The device for photographing the dynamic picture according to claim 5, wherein the photographing module is further configured to: photograph the plurality of images by using a single lens; and store the plurality of images continuously photographed in a RAW format.

7. The device for photographing the dynamic picture according to claim 5, wherein, the photographing module is configured to continuously photograph a plurality of images at different shutter speeds by respectively photographing one or more groups of images in a continuous photographing mode at different shutter speeds; and wherein each group of images in the one or more groups of images comprise one or more static images and one or more dynamic images.

8. The device for photographing the dynamic picture according to claim 7, wherein the composing module is further configured to:

select a static image with a photographing effect which satisfies a preset standard from each group of photographed images, select a dynamic image from a first group of images in which the selected static image is located, and compose the selected static image and the selected dynamic image, wherein the dynamic image is a dynamic image, which has a smallest photographing time difference from the static image, in the first group of images.

* * * * *